United States Patent [19]

Hardwick

[11] Patent Number: 4,645,167

[45] Date of Patent: Feb. 24, 1987

[54] ACCESSORY MOUNTING ARRANGEMENT FOR BOAT SEATS

[76] Inventor: Gary L. Hardwick, 7341 Ash, Prairie Village, Kans. 66208

[21] Appl. No.: 702,626

[22] Filed: Feb. 19, 1985

[51] Int. Cl.$^4$ ............................................. F16M 13/00
[52] U.S. Cl. ...................................... 248/520; 43/21.2; 248/283; 297/184; 297/188
[58] Field of Search ............... 248/283, 512, 520, 538, 248/145, 282, 121, 122; 297/188, 184, 194; 43/21.2

[56] References Cited

U.S. PATENT DOCUMENTS

| | | | |
|---|---|---|---|
| D. 239,015 | 3/1976 | Stout | 43/21.2 X |
| 365,859 | 7/1887 | Porter | 248/282 X |
| 793,233 | 6/1905 | Ryan | 248/282 |
| 2,694,439 | 11/1954 | Murray | 248/282 X |
| 3,077,327 | 2/1963 | Batie et al. | 248/520 |
| 3,550,892 | 12/1970 | Propst | 248/282 |
| 3,601,443 | 8/1971 | Jones | 297/188 |
| 3,712,669 | 1/1973 | Cates | 297/188 |
| 4,318,567 | 3/1982 | Guthier | 297/188 X |
| 4,372,605 | 2/1983 | Cervantes | 297/188 X |
| 4,427,382 | 1/1984 | Hoffmeister et al. | 248/282 X |
| 4,428,617 | 1/1984 | Lawson | 297/188 |
| 4,500,134 | 2/1985 | Kaneko et al. | 297/188 X |

FOREIGN PATENT DOCUMENTS 2315585 10/1973 Fed. Rep. of Germany ...... 297/188

Primary Examiner—Ramon S. Britts
Assistant Examiner—David L. Talbott
Attorney, Agent, or Firm—Kokjer, Kircher, Bradley, Wharton, Bowman & Johnson

[57] ABSTRACT

A fishing boat accessory which mounts a rotatable boat chair and a plurality of support arms which hold fishing gear and accessories. A column on which the chair is mounted includes a stationary base and a spool which can be rotated about the vertical axis of the column. A main support arm extends from the spool and carries on its outer end a collar and a vertical barrel. Extending from the collar is a rod holding arm which carries a fishing rod holder on its outer end. A compartmental tray is mounted on top of the barrel. Extending to the side of the barrel is an auxiliary arm which carries a mounting plate used to support a tackle box. Each arm is individually adjustable so that the rod holder, tray and mounting plate can all be adjusted to the most convenient location for easy access to the fishing gear and accessories.

7 Claims, 5 Drawing Figures

ACCESSORY MOUNTING ARRANGEMENT FOR BOAT SEATS

BACKGROUND AND SUMMARY OF THE INVENTION

This invention relates generally to fishing boat seats and more particularly to an arrangement for mounting fishing gear and accessories at locations which are conveniently accessible to the occupant of the boat seat.

Bass boats and other boats used in sports fishing typically have chairs which can be rotated on the pedestal which supports them. This enables the fisherman to assume various orientations while fishing. Beverage containers, tackle boxes, and other fishing gear and accessory items which must be maintained close at hand are often placed on the deck near the boat seat. Access to the fishing gear is not always convenient because the seat may be rotated to a position from which the necessary items cannot be easily reached. In addition, placement of items on the deck tends to unduly clutter it and can result in fishing gear, beverage containers, and other articles being inadvertently kicked or stepped on by persons walking on the deck. This can result in the spilling of liquids, damage to fishing gear and other objects, and possible personal injury.

U.S. Pat. No. 4,428,617 to Lawson discloses an arrangement which permits a tackle box and a beverage cooler to be supported off of the deck on extended arms of a boat chair. Even though the tackle box and beverage cooler turn with the chair, they are always located directly to the sides of the chair and cannot be adjusted as to their position relative to a fisherman seated in the chair. Because it is not always convenient to reach to the side, this arrangement does not make access to the fishing gear as convenient as possible. Additionally, the Lawson arrangement is somewhat limited in its ability to provide convenient access to small loose objects.

The present invention is directed to a fishing boat accessory which permits fishing gear and other articles to be located at virtually any desired position relative to a swivel mounted boat chair. In accordance with the invention, the boat seat is supported to turn on a specially constructed column having a main support arm extending from it. The main support arm can be adjusted as to its rotative position and carries a rotatable barrel which supports a compartmented tray suitable for holding a beverage container and various types of relatively small loose articles. An auxiliary arm extending from the barrel supports a mounting plate on which a tackle box can be secured. A fishing rod and reel can be received and held by a rod holder carried on another adjustable arm which can be rotated about the axis of the barrel.

Each arm can be individually rotated to the desired position and then locked in place. Consequently, the articles carried on each arm can be independently positioned at the particular location which is most convenient for each person who uses the boat seat. At the same time, the fishing gear, accessory items and beverage container are all removed from the boat deck to thereby reduce the possibility of spillage, damage to the gear and personal injury. Additional accessory items such as an umbrella and/or a lantern can also be maintained at the desired position during rainy weather or night fishing.

DETAILED DESCRIPTION OF THE INVENTION

In the accompanying drawings which form a part of the specification and are to be read in conjunction therewith and in which like reference numerals are used to indicate like parts in the various views.

Figure 1:
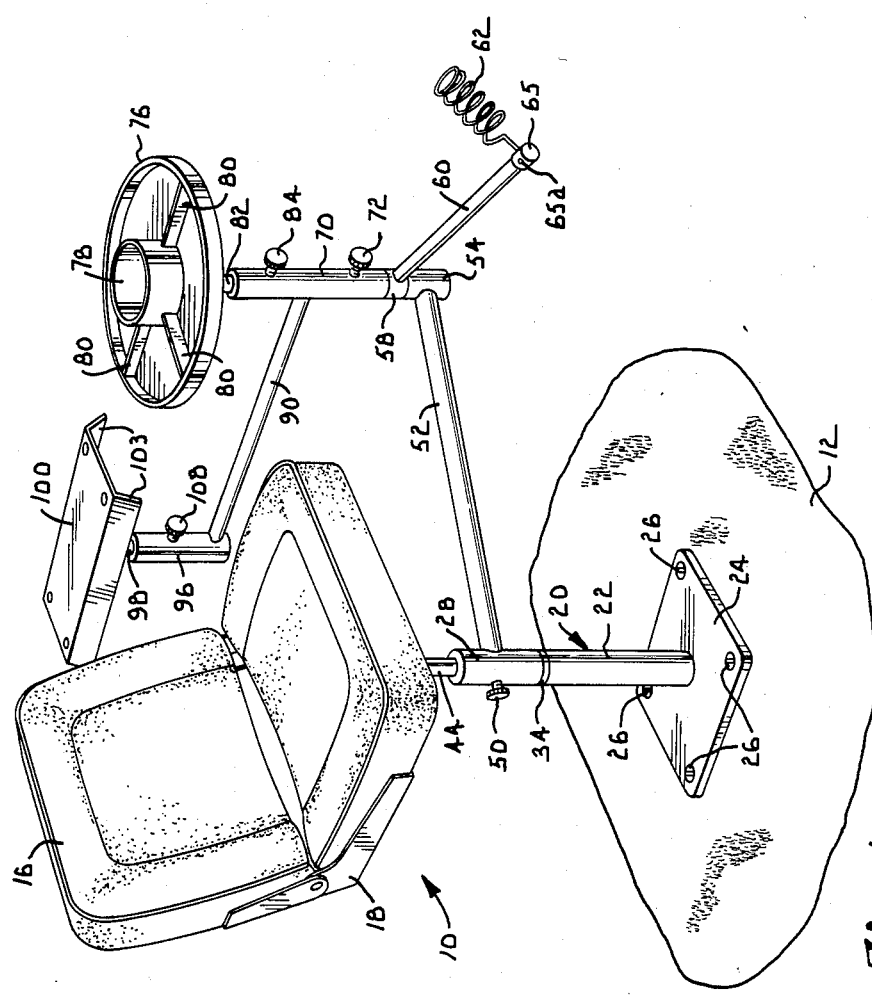
FIG. 1 is a perspective view showing a bass boat chair equipped with an accessory mounting arrangement constructed according to a preferred embodiment of the present invention.

Referring now to the drawings in more detail and initially to FIG. 1, numeral 10 generally designates a boat chair of the type commonly used in a bass boat or other sports fishing boat having a horizontal deck 12. The boat chair 10 includes a seat 14 and a back rest 16 which are connected by a pair of folding brackets 18. The back rest 16 is normally in the vertical position shown in FIG. 1, but the brackets 18 allow it to be folded down on top of the seat 14 when not in use.

Figures 2, 3, 4:
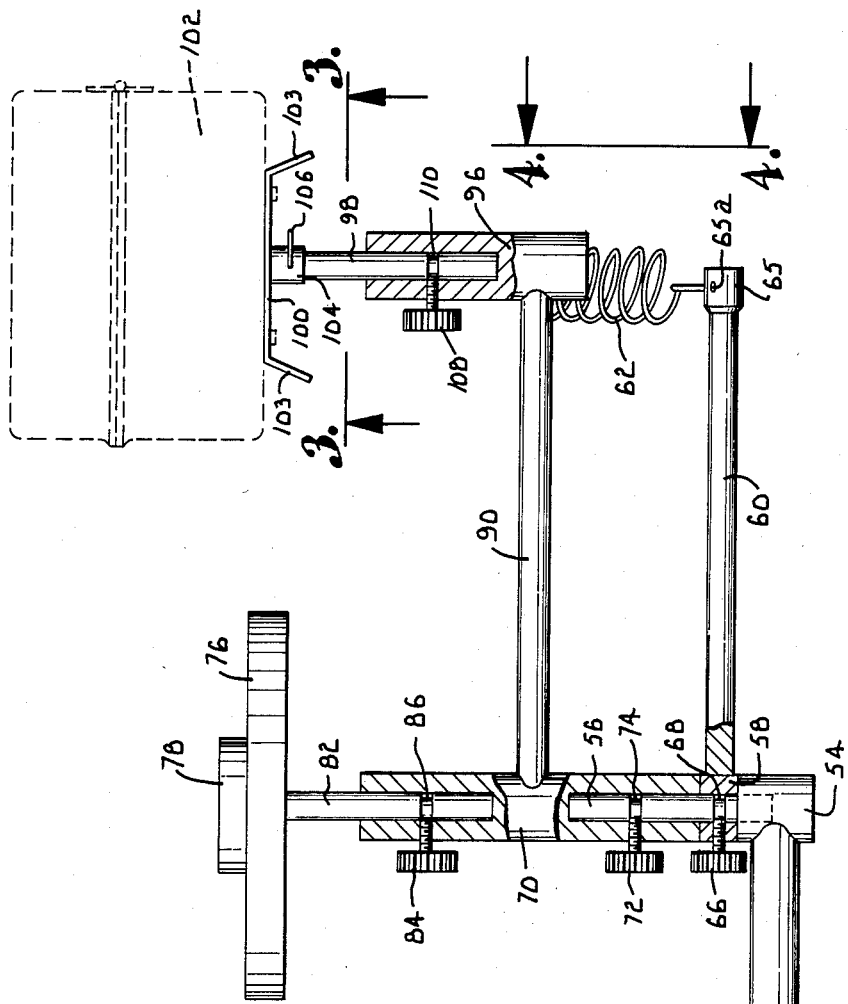
FIG. 2 is an enlarged side elevational view of the accessory mounting arrangement, with portions broken away for purposes of illustration and the boat seat shown only fragmentarily.
FIG. 3 is a fragmentary sectional view taken generally along line 3—3 of FIG. 2 in the direction of the arrows.
FIG. 4 is a fragmentary sectional view taken generally along line 4—4 of FIG. 2 in the direction of the arrows, with a fishing rod and reel shown fragmentarily in broken lines.

With additional reference to FIG. 2, the boat chair 10 is supported on an upright column generally designated by numeral 20. The bottom part of the column 20 is formed by a base 22 secured at its lower end to a flat mounting plate 24. The mounting plate 24 has bolt holes 26 (see FIG. 1) which permit it to be bolted to the boat deck 12.

The top part of column 20 is formed by a spool 28 having a reduced diameter portion 30 received in a cylindrical socket 32 extending into the top of the column base 22. The reduced diameter portion 30 can rotate in socket 32, and spool 28 is thus supported for rotation about the vertical axis provided by column 20. A nylon bushing 34 is interposed between the base 22 and spool 28.

Secured to the bottom of seat 14 is a plate 40. A split sleeve 42 extends from plate 40 and is tightened onto a post 44 by a bolt 46 which extends through a pair of flanges 48 projecting from the sleeve 42. The post 44 extends downwardly into a passage formed in spool 28. A set screw 50 is threaded into spool 28 and may be tightened against post 44 to lock the boat chair against rotation relative to the spool 28. The post 44 may be externally threaded, and sleeve 42 may be internally threaded so that the elevation of the seat 14 may be adjusted by loosening bolt 46 and turning the seat such that it is threaded up or down before the bolt 46 is tightened again.

Figure 5:
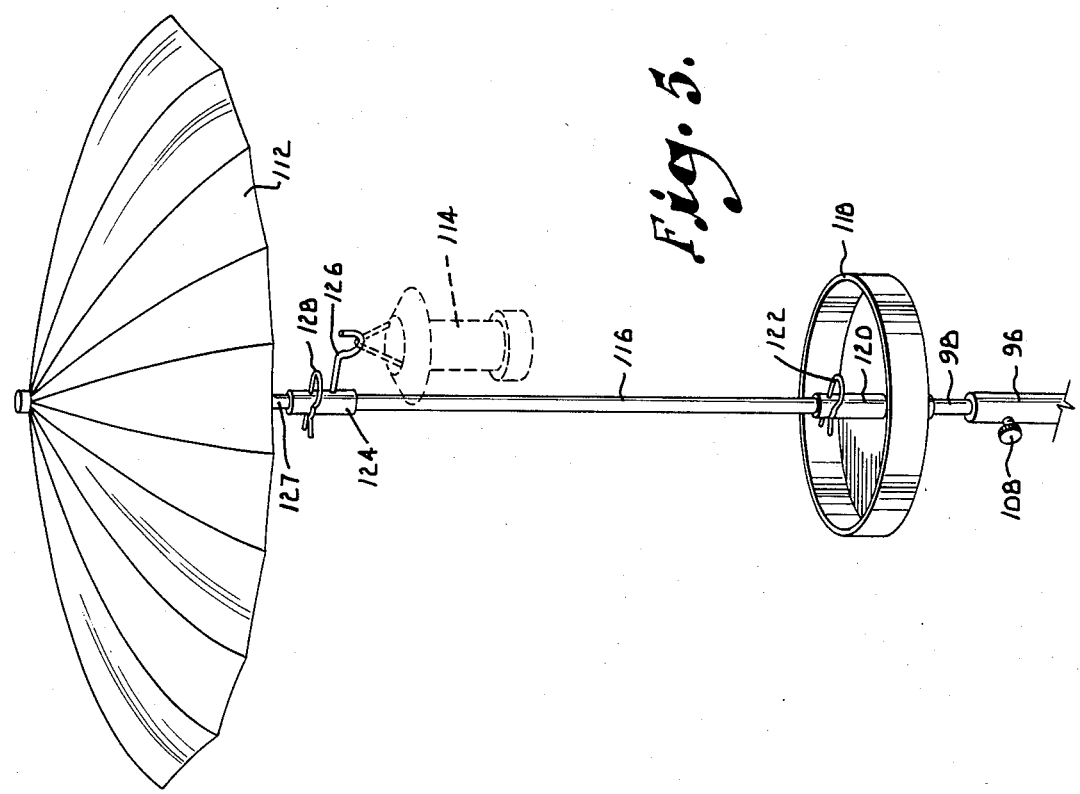
FIG. 5 is a perspective view showing an arrangement that can be used to mount an umbrella and a lantern.

A main support arm 52 extends horizontally from spool 28. Arm 52 is rigidly secured to spool 28 at one end, and the opposite or outer end of arm 52 carries a cylindrical block 54. The bottom end of a vertical pin 56 extends into and is secured to the block 54. A collar 58 is fitted on the pin 56 immediately above block 54 and may be rotated about the vertical axis of the pin. Extending horizontally from column 58 is an arm 60 which carries one or more fishing rod holders 62 on its outer end. Each rod holder 62 may take the form of a coil spring. The handle of a fishing rod 64 (see FIG. 5) may be inserted into each rod holder 62 in order to hold the fishing rod at the appropriate position for fishing. The rod holder 62 is carried on an end cap 65 which is received on the outer end of arm 60. The end cap 65 may be turned about the axis of arm 60 to adjust the orientation of rod holder 62. A set screw 65a serves to lock end cap 65 in place on the end of arm 60.

A set screw 66 is threaded into collar 58 with its tip extending into an annular groove 68 formed in pin 56. When the set screw 66 is tightened against pin 56, collar 58 and arm 60 are locked against rotation relative to the block 54. When the set screw is loosened, collar 58 may be rotated in order to position the rod holding arm 60 at the desired orientation prior to tightening of the set screw.

A vertical barrel 70 is fitted on the top portion of pin 56 and may be rotated about the axis of the pin. A set screw 72 is threaded into barrel 70 with its tip extending into an annular groove 74 formed in pin 56. When set screw 72 is tightened against pin 56, barrel 70 is locked against rotation on the pin. Set screw 72 can be loosened to permit the barrel to be rotated about the pin axis.

A compartmented tray 76 is mounted on top of the barrel 70. As best shown in FIG. 1, a ring 78 suitable for holding a beverage container is provided at the center of tray 76. Radial partitions 80 separate the tray 76 into a plurality of separate compartments which are each adapted to hold loose articles such as lures and other small fishing accessories. The tray 76 has an upstanding rim which serves to maintain the articles on the tray. As best shown in FIG. 2, a vertical post 82 extends from the bottom of tray 76 into the top of the barrel 70. A set screw 84 is threaded into barrel 70 with its tip extending into an annular groove 86 formed in post 82. When the set screw 84 is tightened against post 82, tray 76 is locked in position. The set screw can be loosened to permit post 82 and tray 76 to be rotated relative to barrel 70.

Extending horizontally from the center of barrel 70 is an auxiliary support arm 90. The outer end of arm 90 carries a sleeve 96. The sleeve 96 receives a vertical post 98 which in turn carries a mounting plate 100 used to support a tackle box 102. The tackle box 102 can be bolted or otherwise suitably secured on top of the mounting plate 100. The side edges of plate 100 are provided with down turned flanges 103. The top end of post 98 is received in a sleeve 104 which extends from the bottom of plate 100 and is secured to post 98 by a retaining pin 106.

A set screw 108 is threaded into the side of sleeve 96 and has its tip received in an annular groove 110 formed in post 98. The set screw 108 can be tightened against post 98 to lock the post and the tackle box against rotation relative to sleeve 96. When the set screw is loosened, post 98 can be rotated to orient the mounting plate 100 and tackle box 102 as desired before tightening the set screw again.

It should be understood that arm 90 may, as an alternative to the arrangement shown, be mounted on a collar in the same manner as the other arm 60. The two collars are independently adjustable in this case and are preferably located adjacent to one another.

In use, the support arrangement of the present invention provides rotative support for the boat chair 10 and also supports the fishing rod 64, the tackle box 102 and other fishing gear which may be held by the tray 76. The boat chair 10 can be rotated to the desired position relative to the main support arm by loosening set screw 50 and then properly positioning the boat chair prior to tightening set screw 50.

Set screw 66 can be loosened to permit the rod holding arm 60 to be rotated until the fishing rod holder 62 is in the proper position. Normally, the rod holder 60 will be located generally in front of the boat chair 10, as shown in FIG. 1. Set screw 66 can then be tightened to maintain the position of arm 60 and the fishing rod 64.

To properly position the tackle box 102 or other gear carried on the auxiliary arm 90, set screw 72 is loosened and barrel 70 is rotated until the mounting plate 100 is located at the proper position. Normally, it is desirable for the tackle box 102 to be located immediately to one side of chair 10, as shown in FIG. 1. When arm 90 has been moved to the proper position, set screw 72 is tightened to prevent subsequent rotation of barrel 70. Set screw 108 can be loosened to permit post 98 and mounting plate 100 to be rotated until the tackle box is in the desired orientation relative to the boat chair. If it is desired for one of the compartments provided by tray 76 to be located nearest to the occupant of the boat chair 10, set screw 84 can be loosened and the tray can be rotated to the desired position before again tightening the set screw.

It is to be understood that the positions shown in FIG. 1 for the rod holder 62, the tray 76, and the mounting plate 100 are merely exemplary and are not the only positions at which these members can be located. On the contrary, the multiple support are arrangement provided by the present invention permits each of these members to be located at virtually any desired position relative to the boat chair 10. Thus, each different fisherman can position the support arms and other components such that the fishing gear, beverage containers and other articles they support are located at the positions which best suits the particular preference of the fisherman. It should also be understood that arm 90 can be adjusted in the same manner as arm 60 in the case where arm 90 extends from a collar rather than from the panel 70.

When the boat chair 10 is to be rotated to another orientation relative to the support arrangement, set screw 50 is loosened, and the boat chair can then be turned until the desired new position is reached. Because spool 28, the main support arm 52 and all of the components they carry turn along with the boat seat when screw 50 is tightened, there is no change in the relative positions of the fishing accessories carried by the support arrangement when the boat seat is turned while set screw 50 is in the tightened condition.

FIG. 6 illustrates an arrangement which can be used to support an umbrella 112 and/or a lantern 114. The unit shown in FIG. 6 can be installed on barrel 70 in place of the tray 76, on barrel 96 in place of mounting plate 100, or on an additional arm having its own mounting plate 100, or on an additional arm having its own mounting collar. The umbrella 112 is mounted on a post 116, a tray 118 is secured to a sleeve 120 which receives the bottom end of pole 116 and is secured thereto by a retaining pin 122. If barrel 96 is used to mount the unit, sleeve 120 is fitted on post 98 and secured thereto in the same manner described for the mounting plate sleeve 104. This locates the tray 118 at the proper location to receive various loose articles.

The tray 118 may be compartmented like tray 76 if desired.

Pole 116 is provided at its top end with another sleeve 124. Extending from sleeve 124 is a hook 126 from which the lantern 114 can be hung during night fishing. The collapsible umbrella 112 is carried on a post 127 which is received in the top end of sleeve 124. A retaining pin 128 is extended through sleeve 124 and post 127. Thus, the umbrella 112 and lantern 114 may each be used above, and they may be used together if desired. The umbrella 112 may be removed and collapsed when not needed and may be installed and expanded when needed during rainy weather. The pole 116 may be rotated relative to barrel 70 in order to position the lantern 114 as desired for the best light during night time fishing.

It should be understood that various types of fishing gear and accessories other than those shown may be supported by the arrangement of the present invention.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for supporting a boat seat and fishing accessories, said apparatus comprising:
    a deck mounted column having a substantially vertical axis, said column including a stationary base and a spool mounted on the base in a manner permitting the spool to turn about said vertical axis;
    means for mounting said boat seat on said column in a manner permitting the seat to turn about said vertical axis;
    releaseable means for locking the boat seat to said spool;
    a main support arm extending from said spool, said arm being generally horizontal and being coupled at one end with said spool for rotation therewith about the column axis
    a barrel carried on said arm on the end thereof opposite said one end, said barrel defining a substantially vertical barrel axis offset from the axis of said column and said barrel being supported on the arm to turn about said barrel axis;
    releaseable means for locking said barrel against turning movement about the barrel axis;
    a collar supported to turn about said barrel axis;
    releaseable means for locking said collar against turning movement about the barrel axis;
    an accessory holding tray on said barrel for receiving and holding fishing accessories;
    a first auxiliary arm extending from said barrel, said first auxiliary arm being generally horizontal and being connected at one end with said barrel to turn therewith;
    accessory holding means on said first auxiliary arm for receiving and holding fishing accessories, said accessory holding means being carried on said first auxiliary arm on an end thereof opposite said one end;
    a second auxiliary arm extending from said collar, said second auxiliary arm being generally horizontal and being connected at one end with said collar to turn therewith; and
    a fishing rod holder on said second auxiliary arm on an end thereof opposite said one end, said rod holder being adapted to receive and hold a fishing rod.

2. Apparatus as set forth in claim 1, wherein said accessory holding means comprises:
    a generally vertical sleeve carried on said opposite end of said first auxiliary arm;
    a mounting plate adapted to receive and hold a fishing tackle box;
    a post extending from said plate and received in said sleeve in a manner to turn therein; and
    releaseable means for locking said post to said sleeve.

3. Apparatus as set forth in claim 1, wherein said tray comprises a compartmented tray.

4. Apparatus for supporting a boat seat and fishing accessories, said apparatus comprising:
    a column having a substantially vertical axis, said column having a stationary base and a spool supported on said base for rotation about the axis of the column;
    means for mounting the boat seat on said spool for rotation relative thereto about the axis of the column;
    releaseable means for locking the boat seat against rotation relative to said spool;
    a main support arm rigid with said spool at one end and having an opposite end outboard of said column, said main support arm having a substantially horizontal orientation;
    a barrel carried on said opposite end of said arm, said barrel defining a substantially vertical barrel axis and being rotatable on said arm about the barrel axis;
    an accessory holding tray supported on said barrel for receiving and holding accessories;
    releaseable means for locking said barrel against rotation about said barrel axis;
    a first auxiliary arm having one end connected with said barrel for rotation therewith about the barrel axis and an opposite end outboard of said barrel, said first auxiliary arm having a substantially horizontal orientation;
    accessory holding means on said opposite end of the first auxiliary arm for receiving and holding accessories;
    a collar supported to turn about said barrel axis;
    releaseable means for locking said collar against turning movement about the barrel axis;
    a second auxiliary arm extending from said collar, said second auxiliary arm being generally horizontal and being connected at one end with said collar to turn therewith; and
    a fishing rod holder on said second auxiliary arm on an end thereof opposite said one end, said rod holder being adapted to receive and hold a fishing rod.

5. Apparatus as set forth in claim 4, wherein said accessory holding means comprises:
    a generally vertical sleeve on the opposite end of said first auxiliary arm;

a mounting plate adapted to support a fishing tackle box thereon;

a post extending from said plate, said post being received in said sleeve for turning movement therein; and releaseable means for locking said post to said sleeve.

6. Apparatus for supporting a boat seat and fishing gear and accessories, said apparatus comprising:

a deck mounted column having a substantially vertical axis;

a spool on said column supported to turn about said axis;

means for mounting the boat seat on said spool to turn therewith;

a substantially horizontal main support arm extending from said spool, said arm being coupled with said spool at one end to rotate therewith about said axis and having an opposite end located outboard of said column;

a barrel carried on said opposite end of said main support arm, said barrel defining a substantially vertical barrel axis and being rotatable on said arm about the barrel axis;

releaseable means for locking said barrel against rotation about the barrel axis;

an accessory tray on said barrel adapted to receive and hold accessories;

a substantially horizontal auxiliary arm connected at one end with said barrel for rotation therewith about the barrel axis and having an opposite end located outboard of said barrel;

a mounting plate on said opposite end of the auxiliary arm adapted to receive and hold a fishing tackle box;

a collar supported to turn about the barrel axis;

releaseable means for locking said collar against rotation about the barrel axis;

a substantially horizontal rod holding arm coupled with said collar at one end to rotate therewith about the barrel axis and having an opposite end located outboard of the barrel; and a fishing rod holder on said opposite end of the rod holding arm adapted to receive and hold a fishing rod.

7. Apparatus as set forth in claim 6, including:

a generally vertical sleeve on said opposite end of the auxiliary arm;

a post extending from said mounting plate, said post being received in said sleeve to turn therein; and releasable means for locking said post to said sleeve.

* * * * *